Nov. 12, 1940.  K. ROSENBERG  2,221,525
ELECTRICAL SYSTEM FOR DISPLAYING PICTURES AND
COMMUNICATIONS BY MEANS OF A LAMP SCREEN
Filed Sept. 13, 1935  3 Sheets-Sheet 1
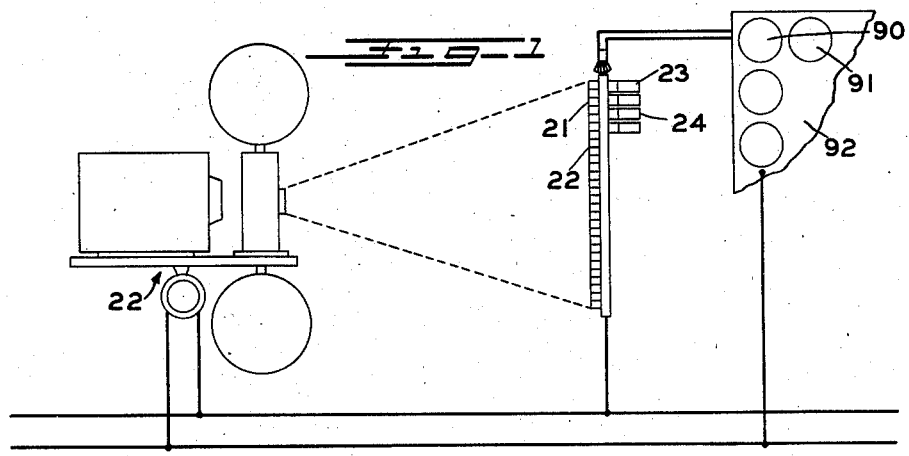
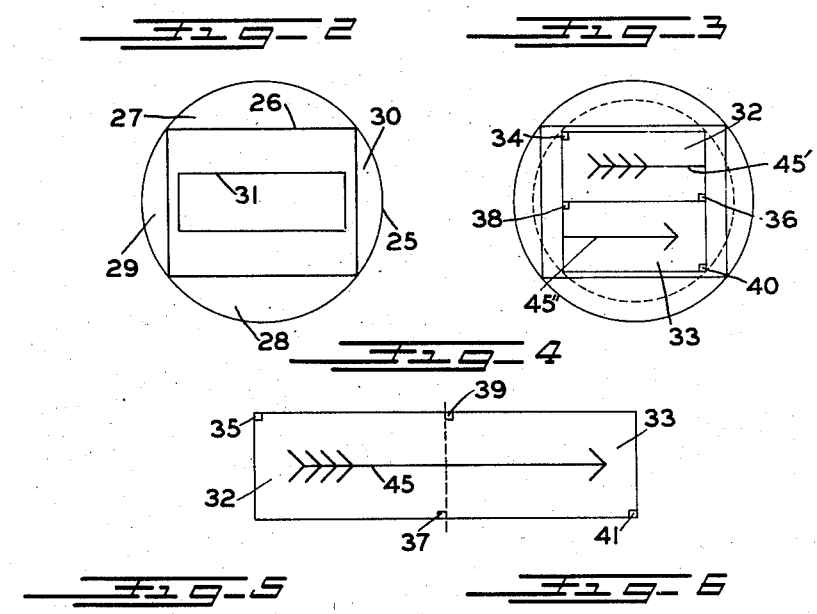
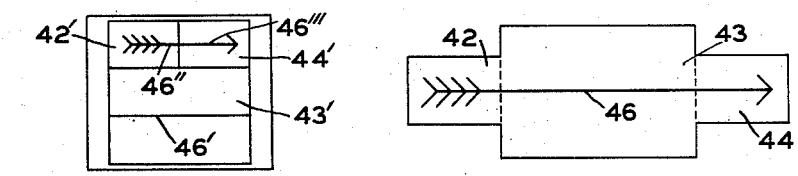
INVENTOR
K. ROSENBERG
By J. Oppenheimer
ATTORNEY

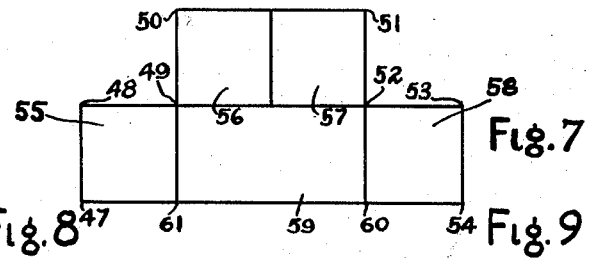
Fig. 7  Fig. 8  Fig. 9
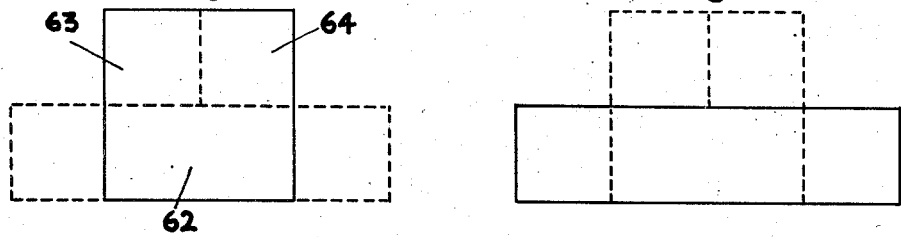
Fig. 10
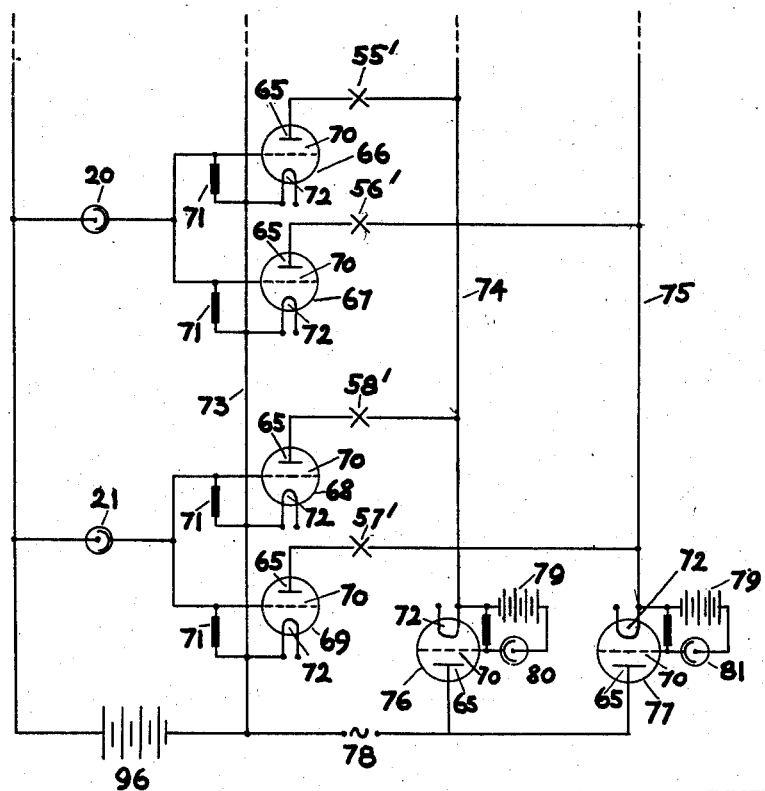

Nov. 12, 1940.  K. ROSENBERG  2,221,525
ELECTRICAL SYSTEM FOR DISPLAYING PICTURES AND
COMMUNICATIONS BY MEANS OF A LAMP SCREEN
Filed Sept. 13, 1935   3 Sheets-Sheet 3

KURT ROSENBERG,
INVENTOR.

BY

ATTORNEY.

Patented Nov. 12, 1940

2,221,525

UNITED STATES PATENT OFFICE 2,221,525

ELECTRICAL SYSTEM FOR DISPLAYING PICTURES AND COMMUNICATIONS BY MEANS OF A LAMP SCREEN

Kurt Rosenberg, New York, N. Y., assignor, by mesne assignments, to American Epok Inc., New York, N. Y., a corporation of New York Application September 13, 1935, Serial No. 40,358
In Germany September 13, 1934

2 Claims. (Cl. 177—346)

This invention relates to improvements in an electrical system for displaying pictures and communications by means of a lamp screen the lamps of which are controlled by light responsive devices such as photo electric cells; particularly the invention relates to improvements of arrangements as described in my co-pending applications Ser. Nos. 692,884, 754,572 and 21,332 (Series ex. 1935) which applications have become respectively Patents 2,069,851, Feb. 9, 1937; 2,119,870, June 7, 1938; and 2,121,987, June 28, 1938.

It is an object of this invention to increase the efficiency of the source of light in the projector used to illuminate the light responsive devices.

It is another object of the invention to increase the variety of displays at a given configuration of the picture frame.

It is a further object of the invention to vary the configurations of a display during operation without varying the configuration of the picture frame itself.

These and other objects of the invention will more fully be understood from the following description with reference to the drawings.

Figure 11:
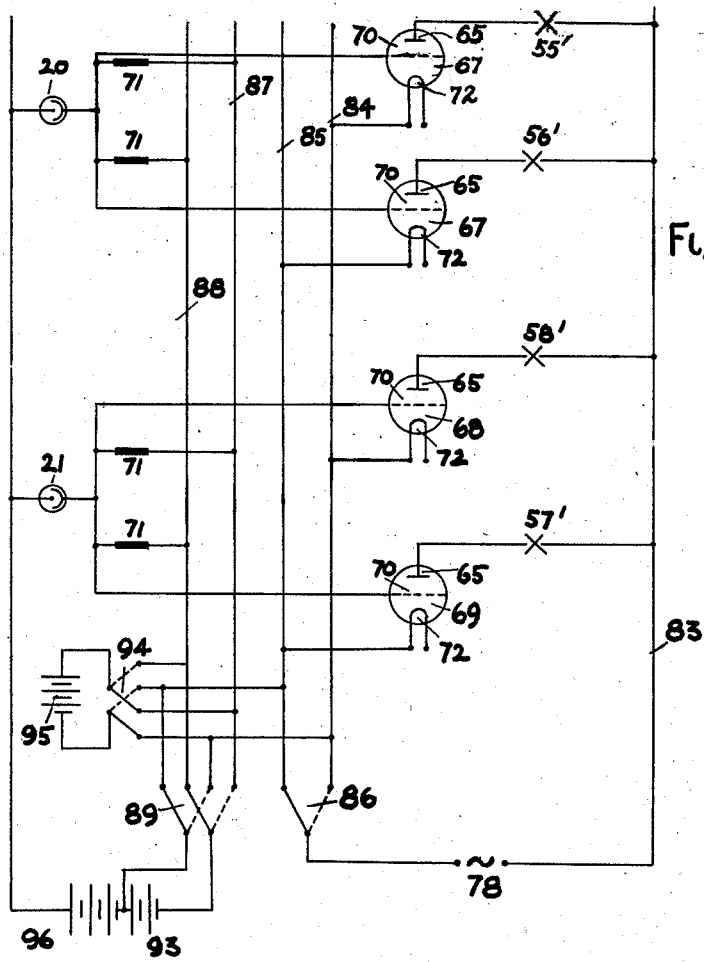
Figure 12:
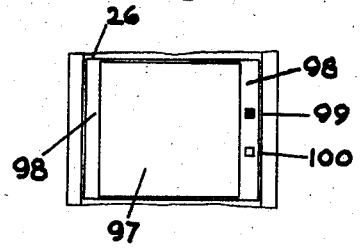

Referring to the drawings, Figure 1 shows in a diagrammatical way a general arrangement as used by the invention; Figure 2 a film gate of a projector; Figure 3 a film gate arranged according to one feature of the invention, and Figure 4 a lamp field controlled thereby; Figure 5 another picture frame according to the invention, and Figure 6 a lamp field controlled thereby; Figures 7, 8 and 9 other lamp field configurations to be controlled according to the invention; Figure 10 a wiring arrangement for controlling the lamp fields according to Figures 7-9; Figure 11 another wiring arrangement adapted for such control; Figure 12 a particular feature of a film adapted for the purposes of the invention; and Figure 13 another wiring arrangement for controlling the lamp fields according to this invention.

In the following specification reference is made to a film comprising a plurality of pictures successively to be brought in controlling position in any well known way. It is to be understood, however, that this invention in the same way applies to any other method of influencing a light beam as for instance by pictures replaced by hand. In general, any kind and type of stencil may be used for the purposes of the invention and they may be brought in operative position automatically and/or by hand.

The picture or stencil itself may be manufactured in any desired way. For advertising purposes, however, with which the invention is primarily concerned, a film may be used, manufactured in the well-known manner of animated cartoons.

While for the purposes of this invention pictures and stencils of any kind and colour may be used, preferably those consisting of black and white elements are utilized which, when projected upon light responsive devices, either illuminate or darken the latter.

According to my previous inventions described in my co-pending applications mentioned above, these light responsive devices or photo cells 20, 21, Figure 1 of the drawings, are arranged in banks upon which the pictures are projected by means of a projector 22 through which the film is moved. Each of these photo cells controls a switching device or a pair of such devices 23, 24, which may be of any convenient type, but form preferably grid controlled gas discharge devices, each of which is connected in series with a source of electric current and a lamp group 90, 91, belonging to the lamp screen 92. Each such lamp group may consist of one or more lamps. By illuminating the photo cell, the switching device may either switch in or switch out the lamp group connected in series therewith, depending from the nature of the switching device and the electric connection between it and the photo cell.

The picture or stencil used for controlling the illumination of the light responsive devices consists of a number of elements or picture points equal to the number of the lamp groups to be controlled.

Up to now these picture points have been arranged relative to each other in a way corresponding to that of the lamp groups to be controlled in the screen. Therefore, if the display had a rectangular configuration of a certain ratio of sides, then the picture frame had to be of the same configuration. Referring to Figure 2, the light spot 25 of circular circumference is shown, formed by the projection of the source of light onto the film gate 26 of the projector. This film gate has a usual ratio of sides of 3:4. Thus, as shown in Figure 2, substantial parts of light are lost, indicated at 27, 28, 29, 30 in Figure 2. Supposing that a lamp bank or field is used for the display having a rectangular shape, the ratio of sides of which is about 3:4 (the same as that of the film gate), then all the light penetrating the film gate is utilized since the picture projected can fill the film gate. If, however, a long rectangular bank of lamps is needed, the picture to be transmitted would have to have a configuration shown at 31 in Figure 2, whereby the major part of light beam would be lost.

It is obvious that the maximum amount of light penetrates the projector, if a square shaped picture is projected. In such case, Figure 3, the light spot indicated in dotted lines is filled by the square picture in a way giving the best efficiency.

According to the invention in cases in which the configuration of the lamp field deviates substantially from a square, the picture to be projected and the filed of lamps to be illuminated is sub-divided into a plurality of portions. Taking the case that a lamp field of the configuration shown in Figure 4 is to be controlled, then it is sub-divided in two portions, 32, 33. In the picture or stencil, portions of similar configuration are provided for, but not side by side as in Figure 4, but one above the other as shown at 32', 33', in Figure 3. The bank of light responsive devices then has to have the same configuration as the picture in Figure 3, i. e., it must be approximately square. The electrical arrangement, i. e., the connection between the switching devices and the controlling light responsive devices has then to be such that the upper portion of the photo cell bank controls the left portion of the lamp filed in Figure 4, while the lower portion of the photo cell bank controls the right portion of the lamp field in Figure 4. A picture point 34 in the upper left corner of the square part-picture according to Figure 3 will then illuminate a photo-cell arranged in the left upper corner of the photo cell bank, and this photo cell will control the lamp group 35 in the upper left corner in Figure 4. A picture point in the lower right corner 36 of the upper portion 32' in the picture will control a photo cell in corresponding position of the photo cell bank which switches in and out a lamp group positioned at 37 in Figure 4. A picture point 38 of the picture will control a photo cell in corresponding position of the photo cell bank and the lamp group 39 of the screen in Figure 4, while the picture point 40 in the lower right corner of the picture will control similarly the lamp group 41 of the display according to Figure 4.

Obviously in the same way other configurations of lamp banks may be illuminated at a better yield of light offered by the projector as has been possible until now. So, for instance, a configuration of the lamp screen according to Figure 6 may be obtained by sub-dividing it into three portions (separated in the drawings by dotted lines) 42, 43, 44, and positioning in the picture to be projected the portions 42, 44, above or below the portion 43. In this way a picture frame may consist of the lower portion 43' and the two upper portions 42', 44', as shown in Figure 5.

In both exemplifications an arrow 45, 46, respectively is shown. In the feature according to Figures 3, 4, the arrow is sub-divided in the stencil in two parts 45', 45'', while the arrow 46 is sub-divided into three parts, 46', 46'', 46'''.

Although the nature of the display is immaterial, there may be mentioned that in a configuration according to Figure 6, the middle part 43 may for instance show a picture, while the two side parts 42, 44 may show texts.

By sub-dividing the lamp field and correspondingly the picture frame and by re-arranging the portions of the picture into the desired display by means of suitable electric connections between the photo-cells, the switching devices, the source of current and the lamps, there may be obtained various desired effects, at the highest efficiency of the source of light.

So, for instance, a lamp field may be provided for, having the outer configuration 47, 48, 49, 50, 51, 52, 53, 54, Figure 7. The field may be sub-divided in portions 55, 56, 57, 58, 59. There may be desired to display first a field having the configuration 47, 48, 53, 54, consisting of the portions 55, 59, 58, and being of oblong shape, and, subsequently, another field having a square shape 50, 51, 60, 61, and consisting of the portions 59, 56, 57. In order to display these two different configurations, a stencil may be used having a square form similar to the square 50, 51, 60, 61, in Figure 7. In the same way, the photo cell-bank fills a square shaped field shown in Figure 8, consisting of the lower portions 62, and the two upper portions 63, 64. The devices of the portion 62 can permanently be connected with the switching devices and lamps belonging to the field portion 59, while the devices belonging to the field portion 63, 64, are alternately to be connected either with the switching devices and lamps belonging to the field portions 56, 57, or to the field portions 55, 58, or a switching arrangement as described hereinafter may be used. Thereby, either the square or the oblong rectangular display are shown, the former being similar to that indicated in full lines in Figure 8, and the latter in full lines in Figure 9. The dotted lines in Figure 8 enclose the oblong rectangular field not being illuminated while the square display is shown, while in Figure 9 they indicate the square shape remaining dark, while the rectangular display is illuminated.

Taking, for instance, the case that 1000 lamps are arranged in field 59, and 500 lamps respectively in fields 55, 56, 57, 58 each, then at one time the 1000 lamps of field 59, and, in addition thereto, either the twice 500 lamps of the fields 56, 57 or 55, 58, respectively, will be illuminated. It results therefrom that at all times the same number of lamps will be illuminated, although in different relative positions.

For such control, stencils of the same configuration, namely of approximately square form, can be used and the light of the projector will be utilized with the highest efficiency. The transformation from a square to a rectangular shape and vice versa has to be done in an electrical way by suitable switching-over means, which will now be described by way of example.

If the contents of the display in the two different configurations are different, at least two different stencils are to be provided. In such case, also, the series of part pictures of a film utilized for controlling either of two different configurations are to be different.

Referring to the wiring arrangement of Figure 10, lamps 55', 56', 57', 58' are shown, each representing one lamp of the plurality of lamps belonging to the portions 55, 56, 57, 58, respectively, of the lamp field shown in Figure 7. Each of these lamps is controlled by a switching device which may be of any desired mechanical type or, as preferred by the invention, consists of a grid controlled gas discharge tube. The anodes 65 of each of these tubes 66, 67, 68, 69, are connected in series with the lamps, while the grids 70 are connected with the main line 73 by suitable resistors. The cathode 72 of the discharge devices may be heated in any well known way not shown in the drawings. The grids 70 of the tubes 66 and 67 are connected with a photo-cell 20, while the grids 70 of the devices 68, 69 are connected with the photo-cell 21. The cathodes 72 of all discharge devices are connected with the main line 73, while lamps 55', 58' are connected to a main line 74, and the lamps 56', 57' to a separate main 75. The main line 73 and the lines 74, 75, respectively, are connected with a source of alternating current 78, by discharge devices 76, 77. These discharge devices are of a similar type as the other ones, 66, etc., and provided with anodes 65, cathodes 72, and grids 70. Between each of the grids and cathodes a resistor 71 is arranged. Between each of the grids and the mains 74, 75, respectively, a suitable source of direct current 79 and photo-cells 80, 81, are arranged. If photo-cell 80 is illuminated, the gap of the discharge device 76 may become conductive. Supposing that both photo-cells 20, 21, are illuminated, then each second half-wave of the alternating current of the source 78 may pass the discharge device 76 to the main 74, and the lamp groups 55', 58', to the discharge devices 66, 68, main 73 back to the source 78. If only the photo-cell 20 or 21 is illuminated, then either lamp group 55' or 58' may be illuminated. If photo-cells 20, 21 are not illuminated, then none of the lamp groups 55', 58' will be lit. Lamp groups 56', 57', however, remain dark. Referring to Figure 7, the portions 55, 58 will be illuminated according to the stencil or to the picture, while the portions 56, 57 remain dark. The lighting of portion 59 will be controlled in the ordinary way, i. e., by photo-cells controlling switching-devices connected in series with the lamps of the field portion 59 and a source of alternating current, whereby the photo-cells belonging to this field portion are illuminated through a co-ordinated portion of the picture. In such case, the full line configuration of the lamp field according to Figure 9 is obtained.

If, however, the photo-cell 81 is illuminated, then each second half-wave of the source of current 78 will pass the discharge device 77, the main 75, lamp groups 56', 57', discharge devices 67, 69, main 73, back to source 78, provided that both photo-cells 20, 21 are also illuminated. The lamp groups 55', 58', however, remain dark. Reverting to Figure 7, one learns that the field portions 56, 57 are now lit, while the field portions 55, 58 remain dark. The field portion 59 being under permanent control, as mentioned above, it is obvious that a display of the full line configuration shown in Figure 8 is now performed.

It is obvious that the variety of configurations may be increased thereby that photo-cells 80, 81 are illuminated at the same time, so that the entire lamp field according to Figure 7 is lit. Then, however, the number of lamps lit will be considerably increased in comparison with the other two configurations explained on hand of Figures 8 and 9. However, using a source of alternating current according to the wiring arrangement of Figure 10, during each half-wave of the alternating current the same number of lamps will be lit and the source of current may retain the same size as it would have if different field portions were alternately utilized for the display. In other words, although all the portions 55, 56, 57, 58 are utilized together with portion 59 for the display, only portions 55, 58 or portions 56, 57, respectively are lit together with portion 59 by the alternating current. The half-waves following each other, however, with sufficient speed, the human eye will not be aware of the alternations in the illumination nor will these result in flickering.

In the wiring arrangement according to Figure 11, the source of current 78 is permanently connected by the main 83 with the lamp groups 55' to 57' which are connected in turn with the anodes 65 of the switching tubes 66 to 69. The cathodes 72, however, are alternately connected with the mains 84, 85, which may in turn be alternately connected with the other terminal of the source 78 by means of a switch 86 of any desired type. The grids 70 of the tubes 66, 67 are connected to the photo-cell 20, the grids 70 of the tubes 68, 69 to the photo-cell 21. The grids of tubes 66, 68 are connected with the main 87 by resistors 71, while the grids of tubes 67, 69 are connected with main 88 by resistors 71. A switch 89 is provided for alternately connecting main 87 or 88 with one terminal of a source of direct current 93, while the other terminal of this source may either be connected with main 84 or 85. Thus, either devices 66, 68 or 67, 69 are blocked by applying to their grids a suitable blocking voltage. Another switch 94 connected with a suitable source of direct current 95 is provided in such a manner that a blocking voltage is applied between the grids and cathodes of such discharge devices, which are disconnected by switch 86 from source 78, and by switch 89 from source 93. A suitable source of direct current 96 is provided for the photo-cells in the same way as for the wiring arrangement according to Figure 10. The switches 86, 89, 94 may be of any desired type and may be mechanically connected or controlled by suitable relays in such way that they establish connections either according to the full or to the dotted lines shown in Figure 11. Taking the case that the switches have the position shown in full lines, each representing one lamp of the plurality of lamps belonging to the portions 55, 56, 57, 58, respectively of the lamp field shown in Figure 7, obviously the lamp groups 56', 57', are connected to the source of current 78. Furthermore, the grids of the switching devices 67, 69 connected in series with said lamp groups 56', 57', are connected with the source 93 by the resistors 71. The lamp groups 55', 58', are disconnected from source 78, and a blocking voltage is applied to the grids of the co-ordinated discharge devices 66, 68, resulting from source 95. Now the lamp groups 56', 57', may be controlled by illuminating and darkening the photo-cells 20, 21, respectively. Reverting to Figure 7, it is obvious that the field portions 56, 57 are now put into operation. Field portion 59 may be controlled in the way described in my previous applications mentioned above. By moving the switches 86, 89 into their dotted positions, the field portions 55, 58 may be lit, while field portions 56, 57 remain dark. It is to be understood that also in this arrangement discharge devices may be used as switches 86, 87, such devices being controlled in a similar way as explained for devices 76, 77 with reference to Figure 10.

If such discharge devices controlled by photo-electric cells 80, 81, are used, a film may be provided according to Figure 12. There is shown a film passing through gate 26 of the projector, containing part picture 97 and margins 98. On one of said margins spots 99, 100 are provided, lying in the line between the source of light of the projector and the photo-cells 80, 81. Supposing that the dark spot 99 lies in front of the photo-cell 81, while the light spot 100 lies in front of the photo-cell 80, then the latter will be illuminated, while the former is darkened. Consequently, the switches controlled by photo-cell 80 will be brought or maintained in operative position. When on the subsequent frame of the film the spots 99, 100 reverse their positions, then photo-cell 81 will be illuminated and the switches controlled by it brought in operative position.

Instead of controlling switches of the type of discharge tubes in such optical-electrical way, mechanical relays may be arranged and suitably controlled in a well-known manner.

Figure 13:
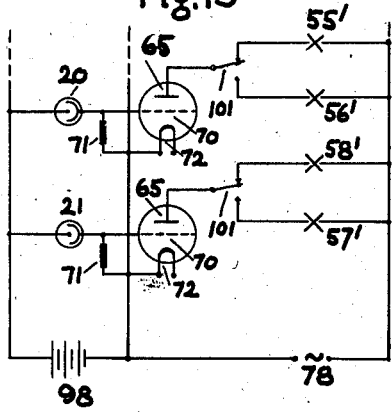

In Figure 13 same reference numbers indicate similar parts as in Figures 10 and 11. Instead of using separate make and break devices for every lamp or lamp group, pertaining to the various field portions, there is provided a single switching device for each two lamp groups belonging to different field portions. Thus, in this example the switching devices and the lamps of one or the other field portion are connected by a commutator 101. In the position of the commutators shown, the lamp groups 55', 58' are connected, while the lamp groups 56', 57' are disconnected. The commutator may be of any suitable type such as a multipole relais. It may be controlled in any suitable way such as in the optical one described above.

In order to avoid sparking on the contacts of any mechanical relais or switch used for the purposes of the invention, the flow of current through the lamps is shortly interrupted while the stencils or part-pictures are exchanged and the switches moved. Either the shutter of the projector may be closed for this purpose for an appropriate period or one or more blank black picture frames may be inserted into the sequence of picture frames forming a film. Since only fractions of a second are required for such switching, the resulting darkening of the screen is either not visible or not disturbing in practice.

It is to be understood that the lamps, or the lamp groups 55' to 58', referred to in the drawings, represent a single lamp, or lamp group, of the plurality of lamps arranged in any portion of the lamp field in question.

It is further to be understood that the invention is not limited to any of the examples given hereinbefore, but its broadest aspect is to be learned from the appended claims.

What I claim is:

1. A display system comprising a bank of lamp groups having circuit connections individual to the groups, a bank of light sensitive devices, a series of stencils controlling said light sensitive devices, said bank of light sensitive devices similar geometrically to a predetermined controlling area of said stencils, individual first switch means in a first side of each lamp group, other second switch means each common to selected pluralities of the second sides of the lamp groups, certain of the light sensitive devices each being connected to control a selected plurality of said first switch means, certain other light sensitive devices each being connected to control individually one of said second switch means, and light projection means including said stencils for operating selected ones of the light sensitive devices.

2. A display system comprising a bank of lamp groups having circuit connections individual to the groups, said lamp groups arranged on said bank in a plurality of areas of individual geometrical configuration, said areas arranged relative to each other so that different selections of numbers of said areas smaller than their total number result in displays of different geometrical configuration, individual first switch means in a first side of each lamp group, other second switch means each common to the second sides of the lamp groups pertaining to one of said different selections, a bank of light sensitive devices and a series of stencils controlling them, certain of the light sensitive devices each being connected to control a selected plurality of said first switch means in the first side of lamp groups each in a different area pertaining to different selections, certain other light sensitive devices each being connected to control individually one of said second switch means to effect one of said selections of areas of the lamp bank, said light sensitive devices controlling said first switch means arranged on the bank within an area geometrically similar to a predetermined controlling area of said stencils, and light projection means including said stencils for operating selected ones of said light sensitive devices.

KURT ROSENBERG.